United States Patent
Kilmartin et al.

(10) Patent No.: US 10,124,325 B2
(45) Date of Patent: Nov. 13, 2018

(54) CERIUM-MODIFIED MANGANESE OCTAHEDRAL MOLECULAR SIEVES AS CATALYSTS FOR SELECTIVE CATALYTIC REDUCTION

(71) Applicant: Johnson Matthey Public Limited Company, London (GB)

(72) Inventors: John Kilmartin, Reading (GB); Janet Mary Fisher, Reading (GB); Jillian Elaine Collier, Reading (GB); David Thompsett, Reading (GB); Raj Rao Rajaram, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/031,041

(22) PCT Filed: Mar. 14, 2014

(86) PCT No.: PCT/IB2014/059831
§ 371 (c)(1),
(2) Date: Apr. 21, 2016

(87) PCT Pub. No.: WO2014/141198
PCT Pub. Date: Sep. 18, 2014

(65) Prior Publication Data
US 2016/0346770 A1    Dec. 1, 2016

Related U.S. Application Data

(60) Provisional application No. 61/784,776, filed on Mar. 14, 2013.

(51) Int. Cl.
| | |
|---|---|
| B01D 53/94 | (2006.01) |
| B01J 23/10 | (2006.01) |
| B01J 23/34 | (2006.01) |
| B01J 37/00 | (2006.01) |
| F01N 3/20 | (2006.01) |
| B01J 29/04 | (2006.01) |
| B01J 37/03 | (2006.01) |
| B01J 37/08 | (2006.01) |
| B01J 37/02 | (2006.01) |
| B01D 53/86 | (2006.01) |
| B01J 37/30 | (2006.01) |
| B01J 35/10 | (2006.01) |

(52) U.S. Cl.
CPC ........ *B01J 29/045* (2013.01); *B01D 53/8628* (2013.01); *B01D 53/9418* (2013.01); *B01J 23/34* (2013.01); *B01J 29/04* (2013.01); *B01J 37/0201* (2013.01); *B01J 37/0215* (2013.01); *B01J 37/0225* (2013.01); *B01J 37/033* (2013.01); *B01J 37/08* (2013.01); *B01J 37/30* (2013.01); *B01D 2251/208* (2013.01); *B01D 2251/2062* (2013.01); *B01D 2255/2065* (2013.01); *B01D 2255/2073* (2013.01); *B01D 2255/50* (2013.01); *B01D 2257/404* (2013.01); *B01J 35/1019* (2013.01)

(58) Field of Classification Search
CPC . B01J 23/10; B01J 23/34; B01J 37/00; B01D 53/9418; B01D 53/9431; B01D 2255/2065; B01D 2255/2073; B01D 2257/402; B01D 2257/404; B01D 2258/012; F01N 3/2066
See application file for complete search history.

(56) References Cited

U.S. PATENT DOCUMENTS

| | | |
|---|---|---|
| 4,695,437 A | 9/1987 | Jung |
| 4,782,039 A | 11/1988 | Lindsey |
| 5,340,562 A | 8/1994 | O'Young et al. |
| 5,523,509 A * | 6/1996 | O'Young ............... B01J 23/34 568/303 |
| 5,545,393 A | 8/1996 | O'Young et al. |
| 5,578,282 A | 11/1996 | O'Young et al. |
| 5,635,155 A | 6/1997 | O'Young et al. |

(Continued)

FOREIGN PATENT DOCUMENTS

| | | | |
|---|---|---|---|
| CN | 101711990 A | 5/2010 | |
| CN | 106430315 A * | 2/2017 | ............. C01G 45/02 |

(Continued)

OTHER PUBLICATIONS

Sun et al; Synthesis, characterization and catalytic activities of vanadium—cryptomelane manganese oxides in low-temperature NO reduction with NH3; Applied Catalysis A: General 393 (2011) 323-330.

(Continued)

Primary Examiner — Timothy C Vanoy

(57) ABSTRACT

Catalysts and articles useful for selective catalytic reduction (SCR) are disclosed. The catalyst comprises a cerium oxide and an octahedral molecular sieve (OMS) comprising manganese oxide. The catalysts, which comprise 0.1 to 50 wt. % of cerium, can be made by doping, ion-exchange, deposition, or other techniques. Also disclosed is an SCR process in which a gaseous mixture comprising nitrogen oxides is selectively reduced in the presence of a reductant and the cerium-modified OMS catalyst. The cerium-modified manganese oxide OMS catalysts offer unexpected advantages for selective catalytic reduction, especially $NH_3$-SCR, including improved thermal stability and improved activity for NOx conversion, especially at relatively low temperatures (100° C. to 250° C.).

18 Claims, 5 Drawing Sheets

(56) References Cited

U.S. PATENT DOCUMENTS

| | | | |
|---|---|---|---|
| 5,702,674 A | 12/1997 | O'Young et al. | |
| 6,797,247 B2 | 9/2004 | Becue et al. | |
| 7,153,345 B2 | 12/2006 | Li et al. | |
| 7,700,517 B2 | 4/2010 | Li et al. | |
| 8,091,351 B2 | 1/2012 | Collier et al. | |
| 2010/0105547 A1* | 4/2010 | Ito | B01D 53/944 |
| | | | 502/304 |
| 2010/0190874 A1* | 7/2010 | Mamedov | B01J 23/002 |
| | | | 518/702 |
| 2012/0067830 A1* | 3/2012 | Alarco | B01J 23/34 |
| | | | 210/758 |
| 2013/0079218 A1* | 3/2013 | Arndt | B01D 53/8675 |
| | | | 502/304 |
| 2016/0288107 A1* | 10/2016 | Kilmartin | B01J 35/04 |

FOREIGN PATENT DOCUMENTS

| | | | | |
|---|---|---|---|---|
| JP | 2004068716 A | * | 3/2004 | F01N 3/08 |
| WO | 2004002611 | | 1/2004 | |

OTHER PUBLICATIONS

Abecassis-Wolfovich; Cerium incorporated ordered manganese oxide OMS-2 materials: Improved catalysts for wet oxidation of phenol compounds; Applied Catalysis B: Environmental 59 (2005) 91-98.

Chen et al.; Catalytic oxidation performance of supported $CeO_2$/OMS-2 catalysts for VOCs; Industrial Catalysts, vol. 19, No. 11, pp. 97-102, Nov. 2011.

* cited by examiner

CERIUM-MODIFIED MANGANESE OCTAHEDRAL MOLECULAR SIEVES AS CATALYSTS FOR SELECTIVE CATALYTIC REDUCTION

FIELD OF THE INVENTION

The invention relates to catalysts useful for selective catalytic reduction, and in particular, to cerium-modified manganese octahedral molecular sieves.

BACKGROUND OF THE INVENTION

Hydrocarbon combustion in diesel engines, stationary gas turbines, and other systems generates exhaust gas that must be treated to remove nitrogen oxides (NOx), including NO, $NO_2$, and $N_2O$. The exhaust generated in lean-burn engines is generally oxidative, and the NOx needs to be reduced selectively with a heterogeneous catalyst and a reductant, which is typically ammonia or a short-chain hydrocarbon. The process, known as selective catalytic reduction (SCR), has been thoroughly investigated.

Many known SCR catalysts utilize a transition metal (e.g., Cu, Fe, or V) coated on a high-porosity support, such as alumina or a zeolite. Zeolites are a well-known variety of molecular sieves that are mostly regular frameworks built from $TO_4$ tetrahedra, in which T is typically silicon, aluminum, or phosphorus.

Manganese oxide octahedral molecular sieves ("OMS") are also known. As the name suggests, octahedral units combine to make the overall structure, which is characterized by one-dimensional channels. Some manganese oxide OMS occur in nature, including hollandites (hollandite, cryptomelane, manjiroite, coronadite) and the poorly crystalline todorokites. Manganese oxide OMS have also been synthesized (see, e.g., U.S. Pat. Nos. 5,340,562; 5,523,509; 5,545,393; 5,578,282; 5,635,155; and 5,702,674 and R. DeGuzman et al., *Chem. Mater.* 6 (1994) 815). In some cases, some of the manganese in the framework of an OMS can be substituted with other metal ions. This is usually accomplished by doping other ions in the process used to make the manganese oxide OMS. For instance, U.S. Pat. No. 5,702,674 teaches to substitute Fe, Cu, Mo, Zn, La, or other metals for Mn in the framework of a manganese oxide OMS. As this reference teaches, manganese oxide OMS are potentially useful for reducing nitric oxide with ammonia, although relatively little is known about their use for an SCR process.

Natural manganese ores (hollandite, cryptomelane) have been used for low-temperature SCR of nitrogen oxides with ammonia (see, e.g., Tae Sung Park et al., *Ind. Eng. Chem. Res.* 40 (2001) 4491).

Manganese oxide OMS catalysts have some drawbacks. For instance, the OMS catalysts can be thermally unstable such that NOx conversion can diminish rapidly as the catalyst ages or is exposed to high temperatures. Moreover, the low-temperature NOx conversion, i.e., at temperatures from 100° C. to 250° C., is typically less than desirable. This is important because lean-burn engines—which are characterized by air/fuel ratios >15, typically 19-50—generate considerable NOx immediately after start-up when the exhaust gas temperature is at its lowest.

More recently, other metals have been suggested for use as dopants for manganese oxide OMS. For instance, vanadium-doped cryptomelane-type manganese oxides (V-OMS-2) have been synthesized and used for low-temperature SCR or NO by ammonia ($NH_3$-SCR) (see Liang Sun et al., *Appl. Catal. A* 393 (2011) 323). Similarly, Chao Wang et al. describe hollandite-type manganese oxides with K+ or H+ in the tunnels and their use for low-temperature $NH_3$-SCR (*Appl. Catal. B* 101 (2011) 598.

Rare-earth metals, including cerium oxides, have been used as components of SCR catalysts (see, e.g., U.S. Pat. Nos. 4,695,437, 4,782,039, and 8,091,351 and references cited therein). For instance, WO 2004/002611 teaches an $NH_3$-SCR catalyst comprising a ceria-doped zeolite. However, cerium oxides do not appear to have been used to modify manganese oxide OMS for use in an SCR process.

The industry would benefit from improved SCR catalysts, particularly low-temperature $NH_3$-SCR catalysts.

SUMMARY OF THE INVENTION

In one aspect, the invention relates to a catalyst useful for selective catalytic reduction (SCR). The catalyst comprises: (a) an octahedral molecular sieve (OMS) comprising manganese oxide; and (b) a cerium oxide. The catalyst comprises from 0.1 to 50 wt. % of cerium. The catalysts can be made by a variety of techniques, including doping, ion-exchange, and deposition. In another aspect, the invention relates to an SCR process. The process comprises selectively reducing a gaseous mixture comprising nitrogen oxides in the presence of a reductant and the cerium-modified OMS catalyst described above. Articles useful for SCR comprising the catalyst and a substrate are also included.

We surprisingly found that cerium-modified manganese oxide octahedral molecular sieves offer advantages for selective catalytic reduction, especially $NH_3$-SCR. In particular, the catalysts have improved thermal stability compared with manganese oxide octahedral molecular sieves alone. Additionally, the catalysts have improved activity for NOx conversion, especially at relatively low temperatures (100° C. to 250° C.).

DETAILED DESCRIPTION OF THE INVENTION

Figure 1:
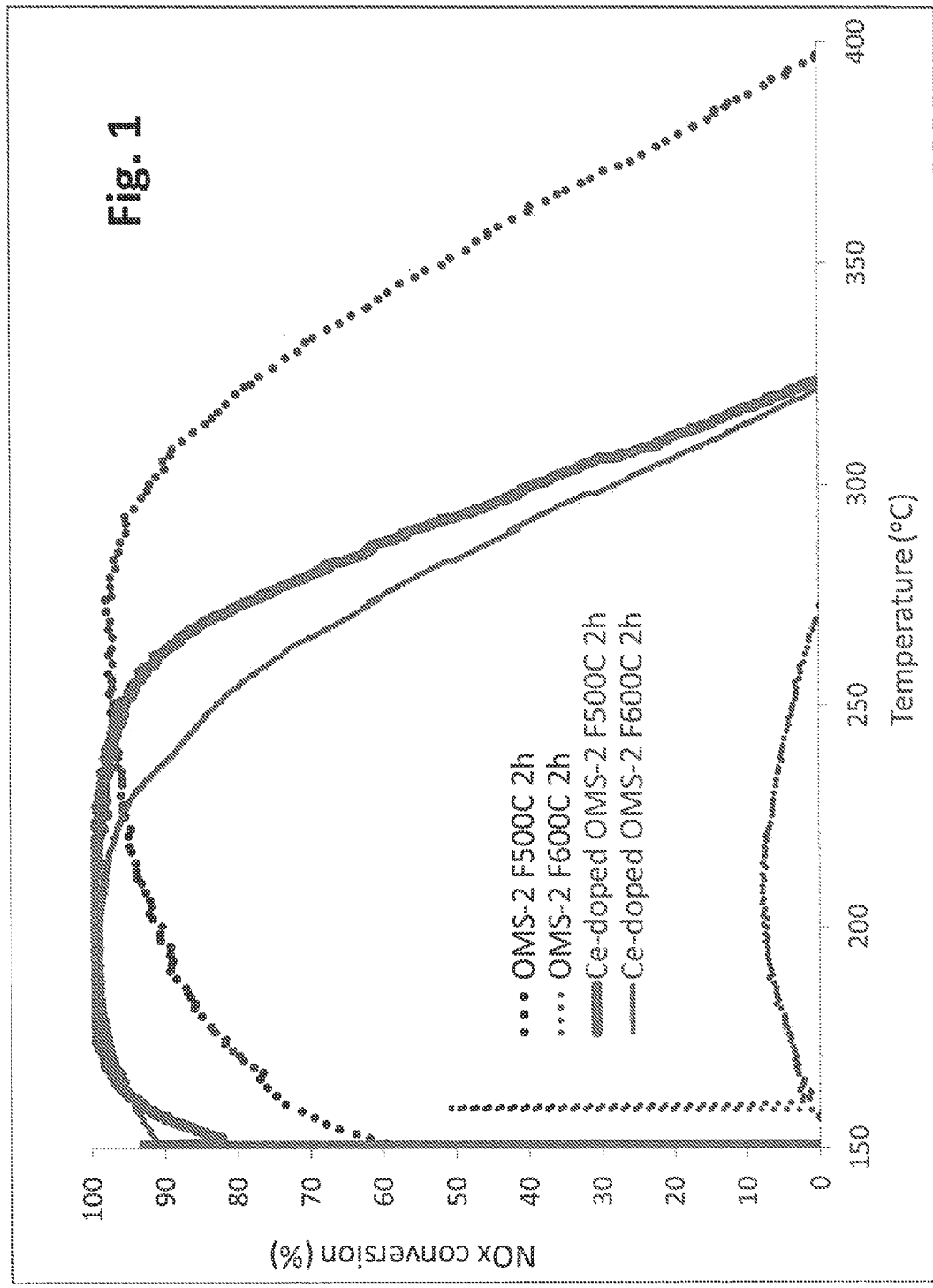
FIG. 1 is a plot of NOx conversion versus temperature for Ce-doped OMS-2 catalysts of the invention and comparative catalysts based on OMS-2 alone.

Cerium-modified catalysts of the invention comprise a cerium oxide and an octahedral molecular sieve comprising manganese oxide.

Suitable octahedral molecular sieves for use in making the inventive catalysts are natural or synthetic compositions comprising principally manganese oxides. Manganese oxide octahedral molecular sieves ("OMS") occur in nature as todorokite, hollandite ($BaMn_8O_{16}$), cryptomelane ($KMn_8O_{16}$), manjiroite ($NaMn_8O_{16}$), and coronandite (PbMn$_8$O$_{16}$). The minerals have a three-dimensional framework tunnel structure assembled from MnO$_6$ octahedra and are distinguished by which cation resides in the tunnels.

Preferably, the OMS is synthesized. Methods developed by Professor Steven Suib and coworkers and reported in many scientific papers and patents can be used. See, for example: U.S. Pat. Nos. 5,340,562; 5,523,509; 5,545,393; 5,578,282; 5,635,155; 5,702,674; 6,797,247; 7,153,345; and 7,700,517, the teachings of which are incorporated herein by reference. See also: R. DeGuzman et al., *Chem. Mater.* 6 (1994) 815). Synthetic octahedral molecular sieves are preferred for selective catalytic reduction and other catalytic processes because they have substantially homogeneous tunnel structures as opposed to the more randomly distributed structures of the natural minerals.

The tunnel structure of the OMS will vary depending on the synthetic approach used. For example, OMS-2, which has the (2×2) tunnel structure of hollandite, can be prepared in a hydrothermal reaction of manganese sulfate, nitric acid, and potassium permanganate (see U.S. Pat. No. 5,702,674). In contrast, OMS-1 has the (3×3) tunnel structure of todorokites and can be prepared by adding a magnesium permanganate solution to basic manganese(II) hydroxide, followed by aging and washing steps (see, e.g., U.S. Pat. No. 5,340,562). OMS having a (4×4) tunnel structure can also be used (see, e.g., U.S. Pat. No. 5,578,282), as well as OMS having a (2×3) structure (see, e.g., U.S. Pat. No. 6,797,247). If desired, the framework of the OMS can be substituted with other metals (see, e.g., U.S. Pat. No. 5,702,674). Octahedral molecular sieves having (2×2) and (3×3) tunnel structure are preferred for an SCR process. OMS-2 is particularly preferred.

Typically, a source of manganese cation (e.g., MnCl$_2$, Mn(NO$_3$)$_2$, MnSO$_4$, Mn(OAc)$_2$, etc.), a source of permanganate ion and counter cation (e.g., alkali metal or alkaline earth metal permanganates), and any framework-substituting metal cation source are combined and reacted under conditions of temperature, pressure, pH, and other factors effective to give a manganese oxide OMS having the desired structure. The mixture can be heated in a closed system, generating autogenous pressure, or the reaction can be performed under atmospheric conditions.

The OMS are principally manganese oxide-based. Thus >50 mol %, preferably >75%, and more preferably >95%, of the metal cations present in the framework structure of the OMS are manganese cations. These amounts include any amount of doped metal cation, but not amounts of metals that may be deposited on the surface of the OMS.

The molar ratio of permanganate ion to manganese cation is often important in determining the nature of the resulting OMS. The ratio of concentrations [MnO$_4^{-1}$]/[Mn$^{+2}$] is preferably within the range of 0.05 to 3.0, with low ratios (0.3-0.4) being ideal for making todorokites and somewhat higher ratios (0.1-1.5) being more preferred for making hollandites.

The pH also influences the nature of the OMS produced. Low pH (0 to 4) is preferred for making hollandites, while a high pH (>13) is desirable for making todorokites.

Reaction temperatures for making the OMS can vary over a wide range and can also be used to influence the type of product generated. Generally, the temperature can be within the range of 25° C. to 300° C., with 70° C. to 160° C. being preferred for making hollandite OMS structures, and 130° C. to 170° C. being preferred for making todorokites.

In addition to the manganese oxide OMS, catalysts of the invention comprise a cerium oxide. Preferably, the cerium oxide is cerium(IV) oxide, cerium(III) oxide, or a mixture thereof.

The amount of cerium (as Ce) in the catalyst is 0.1 to 50 wt. % based on the amount of catalyst. A more preferred range is 1 to 25 wt. %; even more preferred is the range from 5 to 15 wt. % Ce.

Other oxides and mixed oxides can be incorporated into the catalyst, including titanias, zirconias, silicas, aluminas, silica-aluminas, niobias, and the like, and mixtures thereof.

The cerium content may be introduced in a variety of different ways and forms. Some convenient approaches for introducing cerium are described below.

For instance, a cerium compound can be deposited on the manganese oxide OMS from a solution, dispersion, or suspension, followed by concentration of the resulting mixture. Calcination is then preferably used to generate the finished catalyst.

In a common approach, a pre-formed manganese oxide OMS is combined with a water-soluble cerium compound (cerium(III) nitrate hexahydrate, cerium(III) chloride, cerium acetate(III) hydrate, or the like) and aqueous hydroxide solution. The resulting precipitate of cerium(III) hydroxide deposits on the OMS. After filtering, the solids are washed, dried, and calcined to give a catalyst comprising principally one or more cerium oxides (principally cerium (IV) oxide, CeO$_2$) on OMS.

In another common approach, a pre-formed manganese oxide OMS is impregnated with a cerium compound using an incipient wetness technique. For example, the OMS can be combined with a small proportion of an aqueous solution of the water-soluble cerium compound such that a powder form is maintained even after combination with the aqueous solution. The solids are dried and calcined to give a catalyst comprising principally one or more cerium oxides on OMS.

In another approach, an aqueous suspension or dispersion of ceria is deposited on a pre-formed manganese oxide OMS, and the mixture is concentrated, dried, and calcined.

Cerium can also be introduced during synthesis of the manganese oxide OMS. This is referred to as a "cerium-doped" catalyst. In one example of this approach, a solution of manganese sulfate, water, and nitric acid is prepared, and an aqueous solution of the water-soluble cerium salt is added. Potassium permanganate solution is then added. After the mixture is heated, typically for a day or more, the resulting Ce-doped OMS product is recovered, washed, dried, and calcined.

Cerium can also be introduced by an ion-exchange process. In this case, the manganese oxide OMS is pre-formed, and the OMS is contacted with an aqueous solution of a water-soluble cerium compound until a desired degree of ion exchange has occurred. The recovered solids are then usually dried and calcined as described above to give a catalyst comprising principally one or more cerium oxides on OMS.

In another approach, a composite catalyst is made by synthesizing the OMS in the presence of suspended or dispersed cerium oxide(s).

Figure 2:
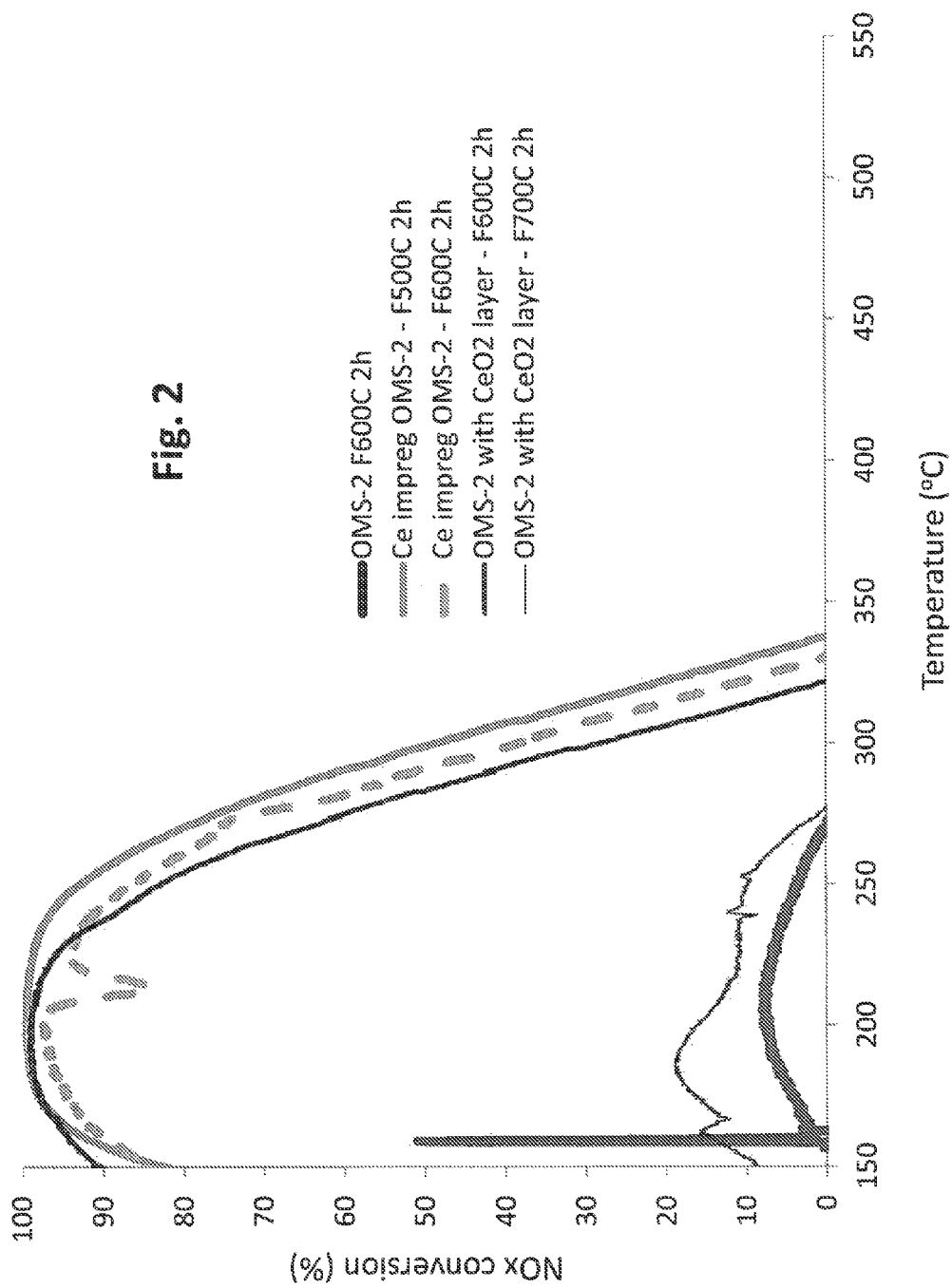
FIG. 2 plots NOx conversion versus temperature for various Ce-modified OMS-2 catalysts of the invention and a comparative catalyst based on OMS-2 alone, and shows the effect of calcination temperature.

It is desirable to calcine the inventive catalysts prior to use in an SCR process. Preferably, calcination is performed by heating the catalyst in an oxygen-containing atmosphere, typically air, at a temperature within the range of 300° C. to 650° C., more preferably 400° C. to 650° C., and most preferably 500° C. to 600° C. As shown in FIG. 2, when the calcination temperature is too high (i.e., about 700° C. or higher), the catalyst may deactivate toward NOx reduction.

Following catalyst preparation, it may be desirable to homogenize the powders before testing. Thus, powder samples of freshly prepared catalysts may be pelletized, pulverized, and passed through a sieve (e.g., a 255-350 μm sieve) prior to testing or use.

The catalyst can be used in any desired form, such as powders, pellets, extrudates, or as a coating or film deposited on a support or substrate.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. In certain embodiments, a washcoat containing the catalyst is applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, in certain embodiments provided is a catalyst article comprising a catalyst described herein coated on and/or incorporated into a substrate.

Certain aspects of the invention provide a catalytic washcoat. The washcoat comprising the catalyst described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. In preferred embodiments, the washcoat loading is $>0.3$ g/in$^3$, such as $>1.2$ g/in$^3$, $>1.5$ g/in$^3$, $>1.7$ g/in$^3$ or $>2.00$ g/in$^3$, and preferably $<3.5$ g/in$^3$, such as $<2.5$ g/in$^3$. In certain embodiments, the washcoat is applied to a substrate in a loading of about 0.8 to 1.0 g/in$^3$, 1.0 to 1.5 g/in$^3$, or 1.5 to 2.5 g/in$^3$.

Two of the most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. In certain embodiments the plate substrate is constructed of metal, preferably corrugated metal.

In certain embodiments, the invention is a catalyst article made by a process described herein. In a particular embodiment, the catalyst article is produced by a process that includes the steps of applying the catalyst composition, preferably as a washcoat, to a substrate as a layer either before or after at least one additional layer of another composition for treating exhaust gas has been applied to the substrate. The one or more catalyst layers on the substrate, including the present catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

In certain embodiments, the present catalyst is disposed on the substrate as a first layer and another composition, such as an oxidation catalyst, reduction catalyst, scavenging component, or NO$_x$ storage component, is disposed on the substrate as a second layer. In other embodiments, the present catalyst is disposed on the substrate as a second layer and another composition, such as such as an oxidation catalyst, reduction catalyst, scavenging component, or NO$_x$ storage component, is disposed on the substrate as a first layer. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. In certain embodiments, the second layer is applied to an inert substrate as a bottom layer and the first layer is top layer that is applied over the second layer as a consecutive series of sub-layers. In such embodiments, the exhaust gas penetrates (and hence contacts) the first layer, before contacting the second layer, and subsequently returns through the first layer to exit the catalyst component. In other embodiments, the first layer is a first zone disposed on an upstream portion of the substrate and the second layer is disposed on the substrate as a second zone, wherein the second zone is downstream of the first.

In another embodiment, the catalyst article is produced by a process that includes the steps of applying the present catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the present catalyst composition can be applied to the substrate in a second zone that is downstream of a first zone containing the additional composition. Examples of additional compositions include oxidation catalysts, reduction catalysts, scavenging components (e.g., for sulfur, water, etc.), or NO$_x$ storage components.

To reduce the amount of space required for an exhaust system, individual exhaust components in certain embodiments are designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 µm, for example about 20 to about 30 µm, about 10 to about 25 µm, about 10 to about 20 µm, about 20 to about 25 µm, about 10 to about 15 µm, and about 15 to about 20 µm.

In general, the production of an extruded solid body containing the catalyst involves blending the catalyst, a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. The catalyst may also be washcoated or otherwise applied to the extruded solid body as one or more sub-layers that reside on the surface or penetrate wholly or partly into the extruded solid body.

Extruded solid bodies containing the catalysts according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the catalyst is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The catalyst described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2CO$), ammonium carbonate, ammonium carbamate, ammonium hydrogen carbonate or ammonium formate.

The zeolite catalyst described herein can also promote the oxidation of ammonia. Thus, in another embodiment, the catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). In certain embodiments, the present catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

In yet another embodiment, an SCR and AMOX operations are performed in series, wherein both processes utilize a catalyst comprising the catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or AMOX process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_X$ compounds and/or oxidation of $NH_3$ in a gas, which comprises contacting the gas with a catalyst described herein for a time sufficient to reduce the level of $NO_X$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, all or at least a portion of the nitrogen-based reductant, particularly $NH_3$, for consumption in the SCR process can be supplied by a $NO_X$ adsorber catalyst (NAC), a lean $NO_X$ trap (LNT), or a $NO_X$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system NO$_x$ reduction efficiency. In the combined system, the SCR catalyst is capable of storing the released NH$_3$ from the NAC catalyst during rich regeneration events and utilizes the stored NH$_3$ to selectively reduce some or all of the NO$_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the catalyst described herein and at least one additional component for treating the exhaust gas, wherein the catalytic article and at least one additional component are designed to function as a coherent unit.

In certain embodiments, the system comprises a catalytic article comprising a catalyst described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing NO$_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 NH$_3$/NO and 4:3 NH$_3$/NO$_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to NO$_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

The following examples merely illustrate the invention; the skilled person will recognize many variations that are within the spirit of the invention and scope of the claims.

Synthesis of OMS-2

Manganese sulfate hydrate (44.0 g, 0.26 mol) is dissolved in a mixture of water (150 mL) and concentrated nitric acid (12 mL) in a round-bottom flask fitted with a condenser and magnetic stir bar. A solution of potassium permanganate (29.5 g, 0.185 mol) in water (500 mL) is added, and the mixture is refluxed for 16 h over a period of three days (day one: 6.5 h; day two: 7.5 h; day three: 2 h). Solids are recovered by filtration and washed with water until the conductivity is about 20 µS. The product is dried at 105° C. Yield: 41.2 g. The catalyst is calcined at either 500° C. ("F500C") for 2 h or 600° C. ("F600C") for 2 h prior to use. For some experiments, the catalyst is calcined at 550° C. for 16 h.

Preparation of Ce-Doped OMS-2

Manganese sulfate hydrate (8.8 g, 0.052 mol) is dissolved in a mixture of water (30 mL) and concentrated nitric acid (3 mL) in a round-bottom flask. Cerium nitrate hexahydrate (4.34 g, 0.010 mol) is dissolved in water (20 mL) and added to the mixture. A solution of potassium permanganate (5.89 g, 0.037 mol) in water (100 mL) is added, and the mixture is refluxed for about 15 h over two days. The product is then filtered and washed with water (7×400 mL) until the conductivity is 130 µS. The product is dried 105° C. Yield: 8.87 g. BET surface area: 149 m$^2$/g. Assay: Ce: 6.15 wt. %; K: 2.86 wt. %; Mn: 51.6 wt. %. X-ray diffraction analysis shows the (2×2) structure of hollandite. The catalyst is calcined at either 500° C. or 600° C. for 2 h prior to use.

Preparation of Ce-Exchanged OMS-2

Cryptomelane (5.0 g) is stirred in a stoppered bottle with cerium nitrate hexahydrate solution (0.25 M, 250 mL). After about 24 h, the solid is collected by filtration and is re-suspended in a fresh 250-mL portion of the cerium nitrate solution. A total of four exchanges with 250 mL of cerium nitrate each are performed. After the third exchange, the material is left for 4 days instead of 24 h. Following the fourth exchange, the cryptomelane is recovered and washed until the conductivity of the filtrate is well below 100 µS. The material is dried at 100° C. Yield: 4.65 g.

Preparation of Ce-Impregnated OMS-2 (Incipient Wetness)

OMS-2 (4.07 g, about 0.045 mol Mn) is prepared as described above. Cerium nitrate hexahydrate (2.17 g, 0.005 mol) is dissolved in a few mL of water, and this mixture is slowly added with mixing to the OMS-2 powder. The resulting powder sample is oven dried, then calcined at 500° C. for 2 h.

Preparation of CeO$_2$ on OMS-2

Manganese sulfate hydrate (8.8 g, 0.052 mol) is dissolved in a mixture of water (30 mL) and concentrated nitric acid (3 mL) in a round-bottom flask. A solution of potassium permanganate (5.89 g, 0.037 mol) in water (100 mL) is added, and the mixture is refluxed for 6 h. The mixture is allowed to cool overnight and is then filtered and washed with water (2×500 mL). The recovered solids are reslurried in water (200 mL) and a mixture of cerium nitrate hexahydrate (4.34 g, 0.010 mol) in water (40 mL) is added dropwise, along with sodium hydroxide (4M solution). The pH is maintained at about 7-8, and stirring continues for 30 min. after completing the addition. The product is collected by filtration and washed with water (6×500 mL). Final conductivity of the filtrate is about 70 µS. The product is dried at 105° C. and calcined at 400° C. for 2 h. Yield: 9.9 g. BET surface area: 152 m²/g. X-ray diffraction analysis shows poorly crystalline cryptomelane and any ceria of extremely poor crystallinity. Assay: Ce: 13.4 wt. %; K: 3.15 wt. %; Mn: 46.3 wt. %. The catalyst is calcined at 500° C., 600° C., 650° C., or 700° C. for 2 h prior to use. Some catalysts are calcined at 400° C., then 550° C. for 16 h.

Preparation of OMS-2/Ceria Composite

Manganese sulfate hydrate (11.02 g, 0.065 mol) is dissolved in a mixture of water (37.5 mL) and concentrated nitric acid (3.0 mL) in a round-bottom flask fitted with a condenser and magnetic stir bar. Once the manganese sulfate has dissolved, cerium dioxide (10.0 g) is added to form a slurry, which is stirred until homogeneous. A solution of potassium permanganate (7.36 g, 0.047 mol) in water (125 mL) is added, and the mixture is refluxed overnight. The solids are recovered by filtration and washed with water until the conductivity is about 20 µS. The product is dried at 105° C. Yield: about 20 g. The composite catalyst is calcined at 500° C. and then at 550° C. for 16 h prior to use.

Preparation of Fe-Doped OMS-2 (Comparative Example)

Manganese sulfate hydrate (8.8 g, 0.052 mol) is dissolved in a mixture of water (30 mL) and concentrated nitric acid (3 mL) in a round-bottom flask. Iron nitrate nonahydrate (4.04 g, 0.010 mol) is dissolved in water (20 mL) and added to the mixture. A solution of potassium permanganate (5.89 g, 0.037 mol) in water (100 mL) is added, and the mixture is refluxed for about 15 h over two days. The product is then filtered and washed with water (7×400 mL) until the conductivity is about 30 µS. The product is dried 105° C. Yield: 8.7 g. The catalyst is calcined at either 500° C. or 600° C. for 2 h prior to use.

NH₃-SCR Activity Test Conditions

Powder samples of catalysts are obtained by pelletizing the original samples, crushing the pellets, and then passing the resulting powder through a 255-350 µm sieve. The sieved powders are loaded into a synthetic catalyst activity test (SCAT) reactor and tested using the following synthetic diesel exhaust gas mixture (at inlet) including ammonia as the reductant: 350 ppm NO, 385 ppm $NH_3$, 12% $O_2$, 4.5% $CO_2$, 4.5% $H_2O$, balance $N_2$ at a space velocity of 30,000 $h^{-1}$.

Samples are heated gradually from 150° C. to 550° C. at 5° C./min, and the composition of the off-gases is analyzed using FTIR spectroscopy to determine the % conversion of NOx gases.

RESULTS

FIG. 1 shows that the thermal stability of OMS-2 alone is acceptable when the catalyst is calcined at 500° C., but not when it is calcined at 600° C. When the somewhat higher calcination temperature is used, the OMS-2 catalyst is inactivated toward NOx conversion. In contrast, cerium-doped OMS-2 catalysts are more thermally stable, exhibiting good NOx conversion whether the catalyst is calcined at 500° C. or 600° C. Moreover, the Ce-doped catalysts demonstrate excellent NOx conversion in the low temperature range (150° C. to 250° C.), which is normally difficult to achieve and, as discussed above, is important for lean-burn engines.

FIG. 2 shows that depositing a cerium compound on OMS-2 followed by calcination at 500° C. to 600° C. generally provides a catalyst that demonstrates good to excellent NOx conversion at low temperatures (150° C. to 250° C.). A high enough calcination temperature deactivates the cerium-modified OMS-2 catalyst toward NOx conversion (see especially the results from 700° C. calcination).

Figure 3:
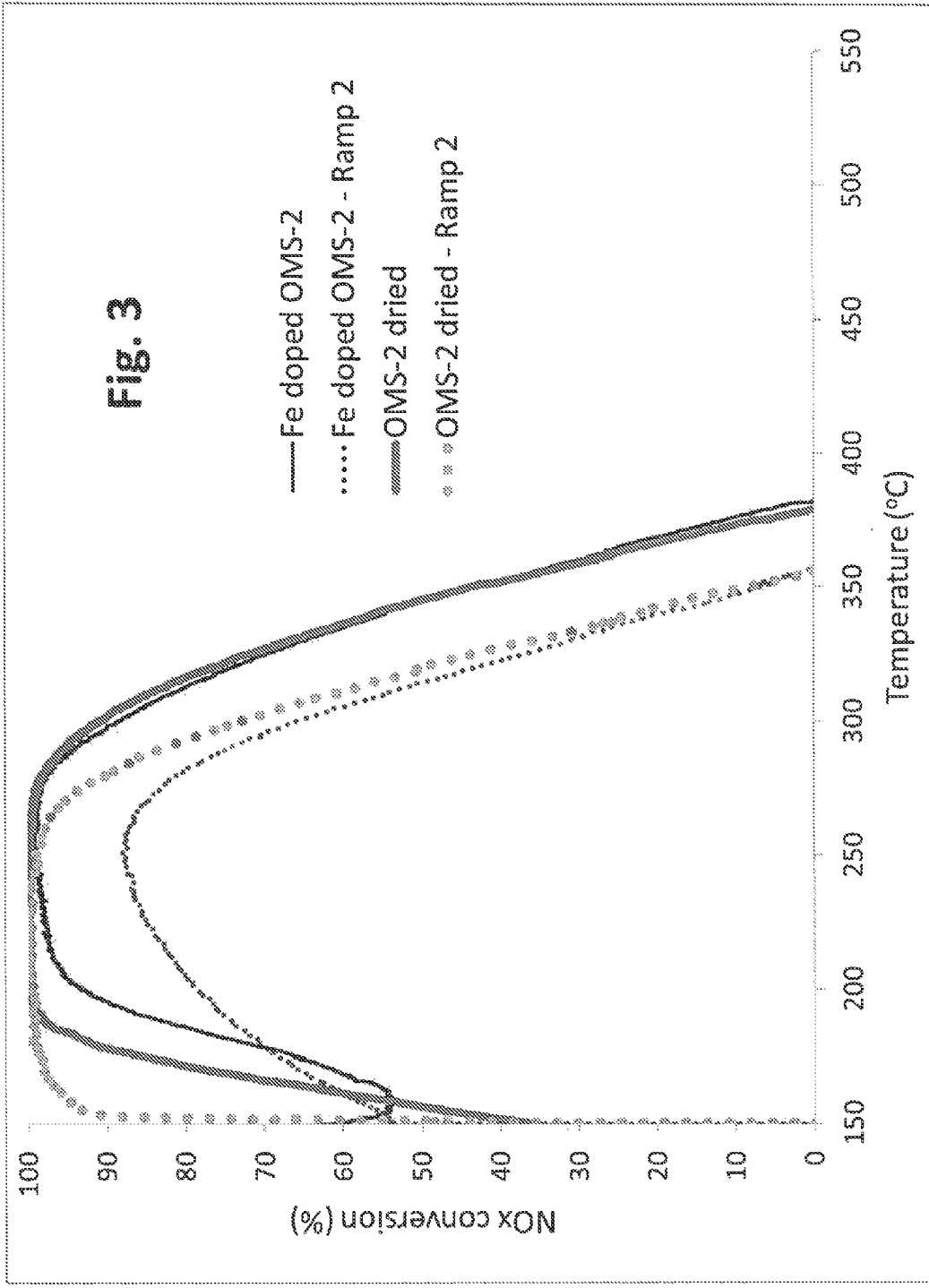
FIG. 3 plots NOx conversion versus temperature for comparative catalysts based on OMS-2 alone and iron-doped OMS-2.

FIG. 3 is a comparative plot demonstrating that iron-doped OMS-2 catalysts do not facilitate low-temperature NOx conversion. In fact, the low-temperature conversion of NOx from these catalysts is not as good as OMS-2 alone. A second pass of the catalyst through the SCAT reactor ("Ramp 2") reveals that the iron-doped catalyst is deactivating faster than the OMS-2 counterpart.

Figure 4:
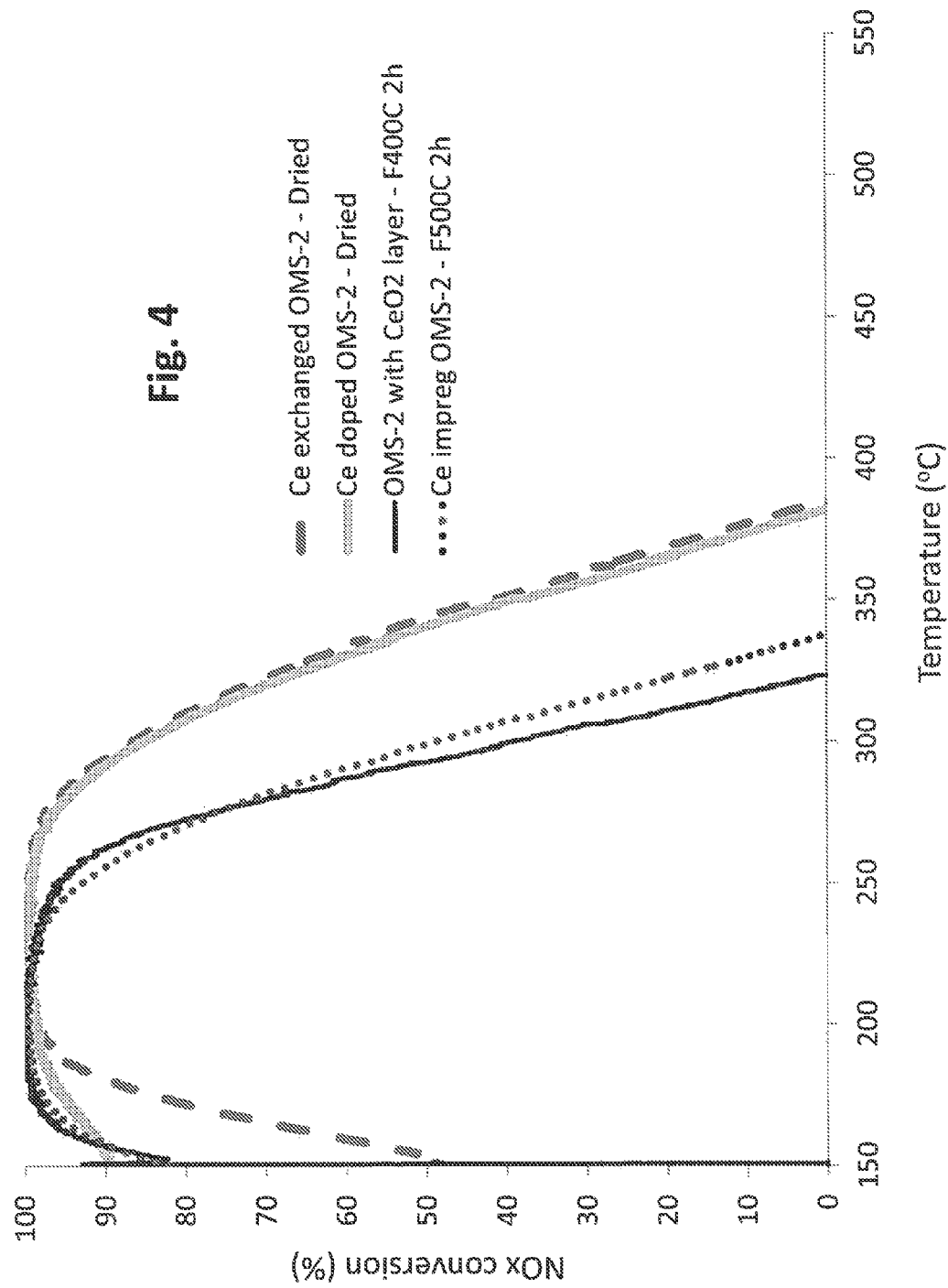
FIG. 4 plots NOx conversion versus temperature for various Ce-modified OMS-2 catalysts of the invention.

FIG. 4 underscores the generally excellent low-temperature NOx conversion of cerium-modified OMS catalysts of the invention. Good results are achieved whether the cerium is included during synthesis of the OMS ("Ce-doped"), is added by ion-exchange ("Ce-exchanged"), is prepared by incipient wetness ("Ce-impregnated"), or is deposited on the OMS from an aqueous solution, dispersion, or suspension.

Figure 5:
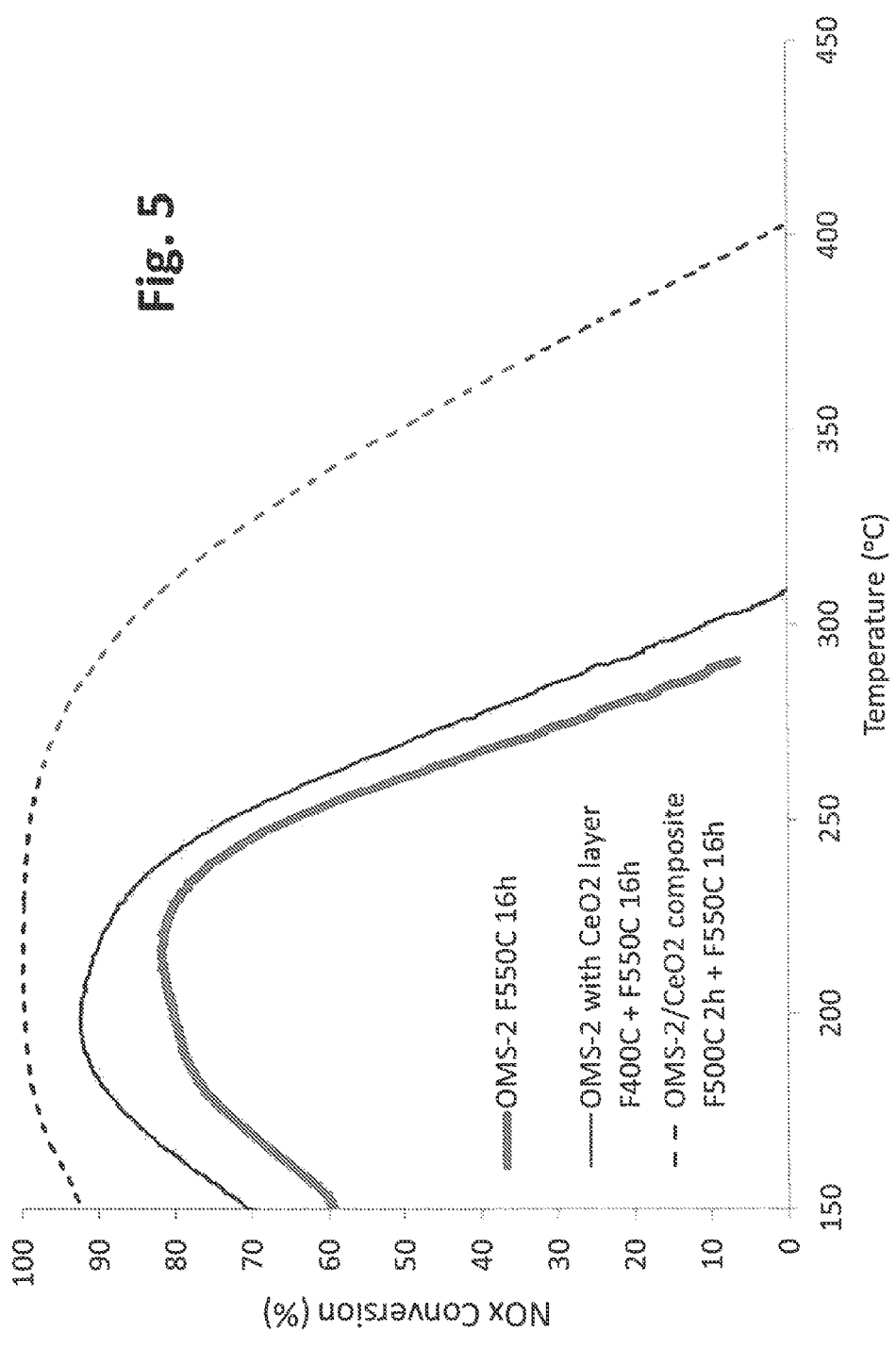
FIG. 5 plots NOx conversion versus temperature for various aged Ce-modified OMS-2 catalysts of the invention and a comparative catalyst based on OMS-2 alone.

FIG. 5 demonstrates the impact of aging catalysts for 16 h at elevated temperature on NOx conversion. The $CeO_2$ on OMS-2 provides some improvement versus OMS-2 alone. However, a composite catalyst made by forming OMS-2 in the presence of $CeO_2$ demonstrates much better NOx conversion over a wide temperature range.

The preceding examples are intended only as illustrations; the following claims define the scope of the invention.

We claim:

1. A catalyst useful for selective catalytic reduction, comprising:
    (a) an octahedral molecular sieve (OMS) comprising manganese oxide; and
    (b) a cerium oxide;
wherein the catalyst comprises from 0.1 to 50 wt. % of cerium,
wherein the OMS is formed in the presence of cerium oxide.

2. The catalyst of claim 1 made by adding a cerium compound during synthesis of the OMS.

3. The catalyst of claim 1 made by contacting the OMS with an aqueous solution of a cerium compound and drying the resulting ion-exchanged material.

4. The catalyst of claim 1 made by depositing a cerium compound on the OMS from a solution, dispersion, or suspension, and concentrating the resulting mixture.

5. The catalyst of claim 4 made by incipient wetness.

6. The catalyst of claim 1 calcined at a temperature within the range of 300° C. to 650° C. following its preparation.

7. The catalyst of claim 1 wherein the octahedral molecular sieve is OMS-2.

8. The catalyst of claim 1 wherein the cerium oxide is selected from the group consisting of cerium(III) oxide, cerium(IV) oxide, and mixtures thereof.

9. The catalyst of claim 1 comprising from 5 to 15 wt. % cerium.

10. A process which comprises selectively reducing a gaseous mixture comprising nitrogen oxides in the presence of a reductant and a catalyst useful for selective catalytic reduction, the catalyst comprising:
    (a) an octahedral molecular sieve (OMS) comprising manganese oxide; and
    (b) a cerium oxide;

wherein the catalyst comprises from 0.1 to 50 wt. % of cerium.

11. The process of claim 10 wherein the reductant is selected from the group consisting of ammonia and $C_1$-$C_8$ hydrocarbons.

12. The process of claim 10 wherein the reductant is ammonia.

13. The process of claim 10 wherein the catalyst is a cerium-doped OMS-2.

14. The process of claim 10 wherein the catalyst is a cerium oxide on OMS-2.

15. The process of claim 10 wherein the catalyst is cerium-exchanged OMS-2.

16. The process of claim 10 wherein % conversion of nitrogen oxides at temperatures within the range of 100° C. to 200° C. improves compared with that of a similar process in which a cerium-free OMS catalyst is used.

17. The process of claim 10 wherein the catalyst demonstrates improved thermal stability compared with that of a cerium-free OMS catalyst.

18. An article for treating a gas containing nitrogen oxides, comprising a substrate and, deposited on the substrate, a catalyst useful for selective catalytic reduction, the catalyst comprising:
 (a) an octahedral molecular sieve (OMS) comprising manganese oxide; and
 (b) a cerium oxide;
wherein the catalyst comprises from 0.1 to 50 wt. % of cerium.

* * * * *